(12) United States Patent
Keshavamurthy et al.

(10) Patent No.: US 11,055,288 B2
(45) Date of Patent: Jul. 6, 2021

(54) EVALUATION OF PROGRAMMABLE CONDITIONS APPLICABLE TO AN OPERATION

(71) Applicant: SAP SE, Walldorf (DE)

(72) Inventors: Raghavendra Keshavamurthy, Santa Clara, CA (US); Parul Bhalla, Palo Alto, CA (US); Sudhir Bhojwani, Mountain View, CA (US); Yuan Tung, Fremont, CA (US)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 15/658,873

(22) Filed: Jul. 25, 2017

(65) Prior Publication Data

US 2019/0034938 A1    Jan. 31, 2019

(51) Int. Cl.
*G06F 16/2455* (2019.01)
*G06Q 30/00* (2012.01)
*G06Q 10/06* (2012.01)

(52) U.S. Cl.
CPC ... *G06F 16/24553* (2019.01); *G06Q 10/0631* (2013.01); *G06Q 30/018* (2013.01)

(58) Field of Classification Search
CPC ............ G06F 16/24553; G06Q 30/018; G06Q 10/0631
See application file for complete search history.

(56) References Cited

U.S. PATENT DOCUMENTS

| 6,405,178 B1* | 6/2002 | Manchala | G06Q 10/087 705/26.1 |
| 6,892,238 B2* | 5/2005 | Lee | G06Q 30/02 709/224 |
| 7,065,745 B2* | 6/2006 | Chan | G06N 5/04 717/117 |

(Continued)

FOREIGN PATENT DOCUMENTS

| WO | WO-0113303 A1 | 2/2001 |
| WO | WO-03036847 A2 | 5/2003 |

OTHER PUBLICATIONS

"U.S. Appl. No. 15/658,858, Non Final Office Action dated Aug. 1, 2019", 26 pgs.

(Continued)

*Primary Examiner* — Miranda Le
(74) *Attorney, Agent, or Firm* — Schwegman Lundberg & Woessner, P.A.

(57) ABSTRACT

Example embodiments for evaluating programmable conditions applicable to an operation are described. In an example embodiment, a request to evaluate one or more programmable conditions applicable to an operation is received. The request includes data associated with the operation. One or more objects representing the one or more programmable conditions are retrieved from a database. The one or more objects include executable code for determining compliance of the operation with the one or more programmable conditions. At least a portion of the executable code is executed based on the data associated with the operation. An output (Continued)

of the executable code is returned to a computing system issuing the request. The output includes an indication as to whether the operation complies with the one or more programmable conditions.

19 Claims, 12 Drawing Sheets

(56) References Cited

U.S. PATENT DOCUMENTS

| | | | | |
|---|---|---|---|---|
| 7,095,854 | B1* | 8/2006 | Ginter | G06F 21/10 |
| | | | | 380/231 |
| 7,319,986 | B2* | 1/2008 | Praisner | G06Q 20/10 |
| | | | | 705/39 |
| 7,499,877 | B2* | 3/2009 | Carr | G06Q 10/10 |
| | | | | 705/27.1 |
| 7,761,381 | B1* | 7/2010 | Fitch | G06Q 20/40 |
| | | | | 705/44 |
| 8,001,185 | B2* | 8/2011 | Nicholls | G06Q 10/06311 |
| | | | | 709/204 |
| 8,055,527 | B1* | 11/2011 | Gil | G06Q 10/06 |
| | | | | 705/7.23 |
| 8,190,291 | B2* | 5/2012 | Beane | G06Q 20/12 |
| | | | | 700/236 |
| 8,423,425 | B2* | 4/2013 | Psota | G06Q 30/06 |
| | | | | 705/26.35 |
| 8,626,605 | B2* | 1/2014 | Mesaros | G06Q 30/0627 |
| | | | | 705/26.63 |
| 8,650,129 | B2* | 2/2014 | Bailey, Jr. | G06F 21/564 |
| | | | | 705/64 |
| 8,700,504 | B2* | 4/2014 | Barsade | G06Q 20/04 |
| | | | | 705/31 |
| 8,756,117 | B1* | 6/2014 | Ballaro | G06Q 30/0603 |
| | | | | 705/26.8 |
| 8,904,471 | B1* | 12/2014 | Eisner | G06Q 10/107 |
| | | | | 726/1 |
| 9,590,967 | B2* | 3/2017 | Rich | G06F 21/74 |
| 2001/0011222 | A1* | 8/2001 | McLauchlin | G06Q 30/06 |
| | | | | 705/301 |
| 2001/0047273 | A1* | 11/2001 | Greer | G06Q 10/02 |
| | | | | 705/26.1 |
| 2003/0120477 | A1 | 6/2003 | Kruk et al. | |
| 2003/0120528 | A1 | 6/2003 | Kruk et al. | |
| 2003/0177070 | A1* | 9/2003 | Viswanath | G06Q 99/00 |
| | | | | 705/500 |
| 2004/0024641 | A1* | 2/2004 | Cartwright | G06Q 30/02 |
| | | | | 705/14.66 |
| 2004/0162763 | A1 | 8/2004 | Hoskin et al. | |
| 2005/0071222 | A1* | 3/2005 | Bigus | G06Q 30/02 |
| | | | | 705/14.13 |
| 2005/0071246 | A1 | 3/2005 | Smith et al. | |
| 2005/0203821 | A1* | 9/2005 | Petersen | G06Q 40/06 |
| | | | | 705/36 R |
| 2005/0240493 | A1* | 10/2005 | Johnson | G06Q 30/06 |
| | | | | 705/26.41 |
| 2007/0090179 | A1 | 4/2007 | Konishi et al. | |
| 2007/0180490 | A1* | 8/2007 | Renzi | G06F 21/577 |
| | | | | 726/1 |
| 2009/0177505 | A1* | 7/2009 | Dietrich | G06Q 10/06375 |
| | | | | 705/7.37 |
| 2009/0177512 | A1 | 7/2009 | Dogan et al. | |
| 2009/0187973 | A1 | 7/2009 | Dattathreya et al. | |
| 2010/0274612 | A1* | 10/2010 | Walker | G05B 19/41865 |
| | | | | 705/7.11 |
| 2010/0325028 | A1* | 12/2010 | Tanaka | G06Q 30/06 |
| | | | | 705/26.8 |
| 2011/0289355 | A1 | 11/2011 | Ren et al. | |
| 2012/0296759 | A1* | 11/2012 | Shechtman | G06Q 30/08 |
| | | | | 705/26.3 |
| 2013/0046655 | A1* | 2/2013 | Karkera | G06Q 20/027 |
| | | | | 705/26.41 |
| 2013/0211881 | A1* | 8/2013 | Mohapatra | G06Q 30/0206 |
| | | | | 705/7.35 |
| 2013/0263210 | A1* | 10/2013 | Lim | G06F 9/468 |
| | | | | 726/1 |
| 2014/0052561 | A1* | 2/2014 | Scott | G06Q 10/0875 |
| | | | | 705/26.4 |
| 2014/0122335 | A1* | 5/2014 | Deshmukh | G06Q 20/00 |
| | | | | 705/44 |
| 2014/0164052 | A1 | 6/2014 | Pesci-Anderson et al. | |
| 2014/0164410 | A1 | 6/2014 | Studer et al. | |
| 2014/0279132 | A1 | 9/2014 | Guha et al. | |
| 2014/0310133 | A1* | 10/2014 | Bednar | G06Q 30/0637 |
| | | | | 705/26.82 |
| 2015/0134480 | A1* | 5/2015 | Marks | G06Q 30/0603 |
| | | | | 705/26.35 |
| 2015/0170238 | A1* | 6/2015 | O'Malley | G06Q 30/0611 |
| | | | | 705/26.4 |
| 2016/0239525 | A1 | 8/2016 | Treves et al. | |
| 2017/0236088 | A1* | 8/2017 | Rao | G06Q 10/10 |
| | | | | 705/7.17 |
| 2017/0323241 | A1 | 11/2017 | Gauba et al. | |
| 2019/0034471 | A1 | 1/2019 | Keshavamurthy et al. | |

OTHER PUBLICATIONS

"U.S. Appl. No. 15/658,858, Response filed Nov. 1, 2019 to Non Final Office Action dated Aug. 1, 2019", 12 pgs.

Choudhury, Sidharth, "Downloadable service contracts for disconnected transactions", In Proceedings Twelfth International Workshop on Research Issues in Data Engineering: Engineering E-Commerce/E-Business Systems RIDE-2EC, (2002), 112-122.

"U.S. Appl. No. 15/658,856, Examiner Interview Summary dated Jan. 23, 2020", 4 pgs.

"U.S. Appl. No. 15/658,858, Final Office Action dated Jul. 2, 2020", 17 pgs.

"U.S. Appl. No. 15/658,858, Final Office Action dated Nov. 21, 2019", 15 pgs.

"U.S. Appl. No. 15/658,858, Non Final Office Action dated Mar. 11, 2020", 18 pgs.

"U.S. Appl. No. 15/658,858, Response filed Feb. 18, 2020 to Final Office Action dated Nov. 21, 2019", 9 pgs.

"U.S. Appl. No. 15/653,853, Response filed Jun. 9, 2020 to Non Final Office Action dated Mar. 11, 2020", 14 pgs.

"U.S. Appl. No. 15/658,858, Advisory Action dated Aug. 31, 2020", 3 pgs.

"U.S. Appl. No. 15/658,858, Notice of Allowance dated Oct. 23, 2020", 9 pgs.

"U.S. Appl. No. 15/658,858, Response filed Aug. 24, 2020 to Final Office Action dated Jul. 2, 2020", 12 pgs.

U.S. Appl. No. 15/658,858, filed Jul. 25, 2017, Definition of Programmable Conditions Applicable to an Operation.

* cited by examiner

EVALUATION OF PROGRAMMABLE CONDITIONS APPLICABLE TO AN OPERATION

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
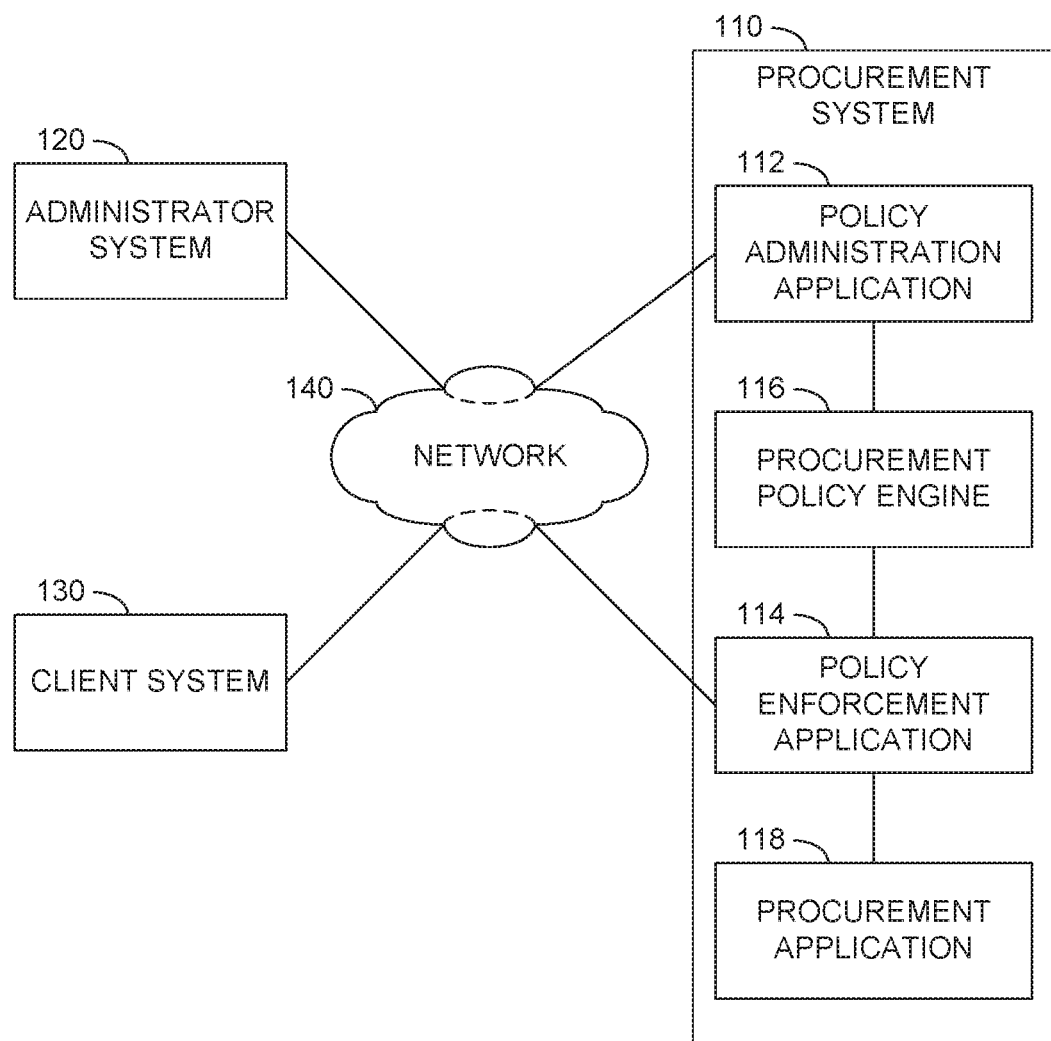
FIG. 1 is a block diagram of an example procurement system accessible by an administrator system and a client system.

FIG. 1 is a block diagram of an example procurement system 110. In an example embodiment, the procurement system 110 may include a policy administration application 112 and a policy enforcement application 114, either or both being communicatively coupled with a procurement policy engine 116. A procurement application 118 may also be included in the procurement system 110. In example embodiments, the procurement system 110 may facilitate various procurement functions (e.g., purchase of a product or service, selection of suppliers, generation and distribution of a request-for-quote, and the like) initiated by members of an organization, such as a corporation. As described in detail below, the procurement system 110 may also facilitate the definition and evaluation of procurement policies governing the procurement functions via the procurement policy engine 116.

Also in an example embodiment, an administrator system 120 and a client system 130 may access the procurement system 110 via a communication network 140. In example embodiments, the communication network 140 may include one or more of a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof. While a single administrator system 120 and a single client system 130 are depicted in FIG. 1, any number of administrator systems 120 and client systems 130 associated with one or more organizations may employ the procurement system 110.

In an example embodiment, the administrator system 120 may employ a policy administration application 112 configured to define one or more procurement policies under the direction of a user of the administrator system 120. In example embodiments, the policy administration application 112 may be configured to allow the user of the administrator system 120 to define and/or update a procurement policy using a user-friendly text-based language, as opposed to a more technically oriented programming language. Further, the policy administration application 112 may communicate with the procurement policy engine 116 so that the procurement policy engine 116 may process and persist the new or updated procurement policy.

Also in an example embodiment, the client system 130 may employ a policy enforcement application 114 that communicates with the procurement policy engine 116 to implement the procurement policies previously created and stored via the policy administration application 112. Additionally, the policy enforcement application 114 may communicate with one or more procurement applications 118 that perform various procurement functions governed by the procurement policies, such as product purchasing, request-for-quote generation, supplier selection, and so on. An example embodiment of the policy enforcement application 114 is the SAP® Ariba® Guided Buying application, although others may be utilized in other embodiments. Examples of the procurement application 118 may include, but are not limited to, the SAP® Ariba® P2P application, the SAP® Ariba® Sourcing application, and the SAP® Ariba® Supplier Management application.

In the example embodiment of FIG. 1, the administrator system 120 and the client system 130 may be any computing and/or communication device or system capable of communicating with the procurement system 110 via the communication network 140. Examples of the administrator system 120 and the client system 130 may include, but are not limited to, desktop computers, laptop computers, tablet computers, and smartphones. Further, the administrator system 120 and the client system 130 may execute a web browser, phone or tablet application ("app"), or other software to facilitate communication with the procurement system 110. Moreover, the procurement system 110 may be configured as a cloud-based system (e.g., including one or more web server systems, application server systems, database systems, and the like) executing the policy administration application 112, the policy enforcement application 114, the procurement policy engine 116, and the one or more procurement applications 118. In other example embodiments, one or more of the policy administration application 112, the policy enforcement application 114, procurement policy engine 116, and the one or more procurement applications 118 may be resident on, and executed by, the administrator system 120 and/or the client system 130.

In at least some of the example embodiments discussed herein, the procurement policy engine 116 may serve as a single system through which procurement policies may be defined, evaluated, and enforced for multiple procurement applications 118, which are commonplace in many enterprise resource planning (ERP) systems. Moreover, regardless of the procurement applications 118 being used, the procurement policy engine 116 may provide a standardized interface by which many different types of procurement policies, both simple and complex, may be defined. In other example embodiments, various aspects of defining and evaluating programmable conditions (e.g., other than procurement policies) relating to any type of operation that may be governed by such programmable conditions may benefit from application of the various principles described herein. Other aspects and characteristics of these example embodiments will be apparent in view of the following discussion.

Figure 2:
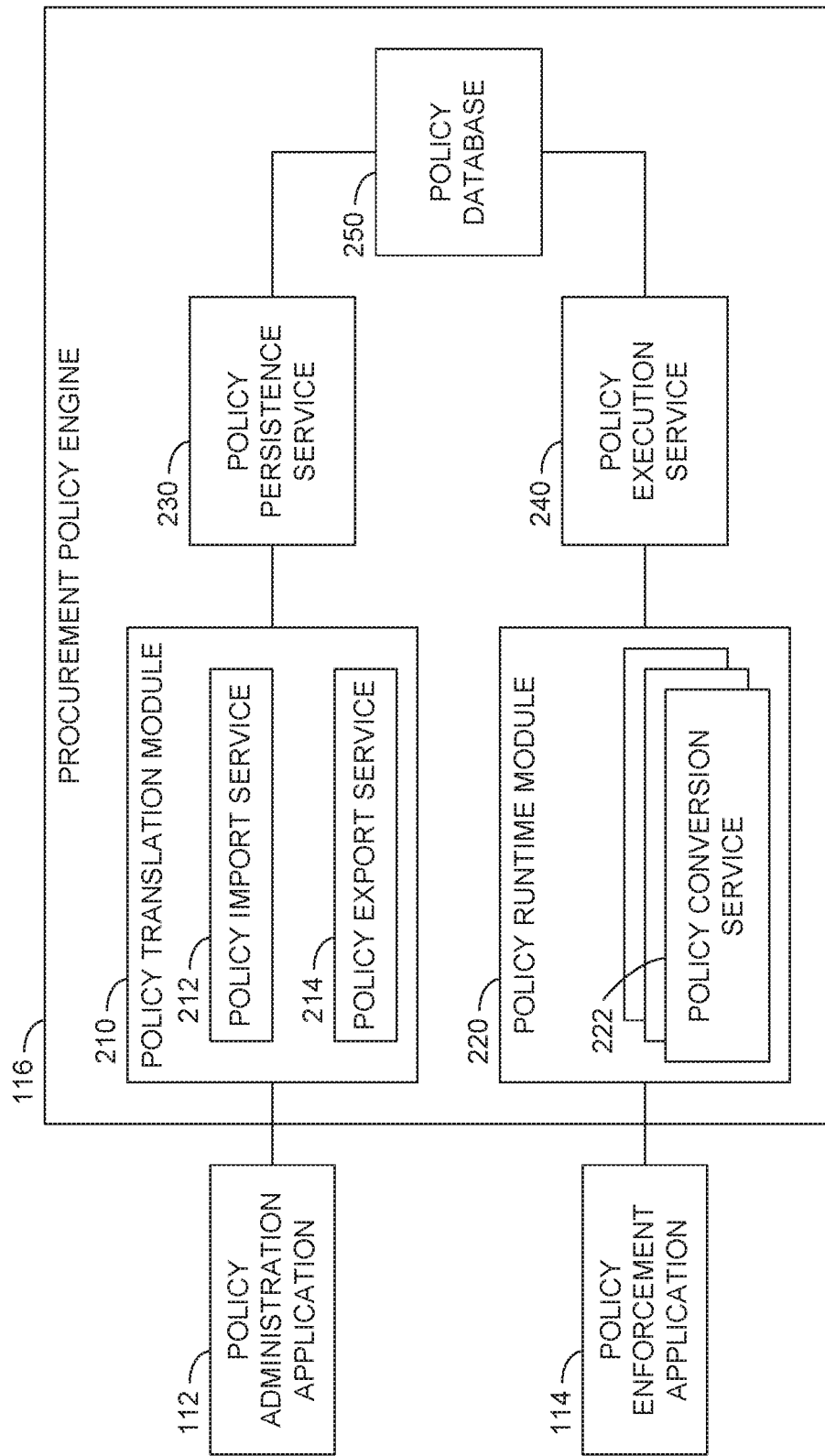
FIG. 2 is a block diagram of an example procurement policy engine employable in the procurement system of FIG. 1.

FIG. 2 is a block diagram of an example embodiment of the procurement policy engine 116 employable in the procurement system 110 of FIG. 1. In this example embodiment, the procurement policy engine 116 may include one or more of a policy translation module 210, a policy runtime module 220, a policy persistence service 230, a policy execution service 240, and a policy database 250. Other modules, services, or components may be included in the procurement policy engine 116, but are not explicitly depicted in FIG. 2 to simplify and focus the following discussion. Also, in some example embodiments, the procurement policy engine 116 may include greater or fewer numbers of modules, as some modules may be combined, and/or some modules may be divided into greater numbers of modules.

In an example embodiment, the policy administration application 112 may be configured to communicate with the policy translation module 210, providing information describing one or more new or updated procurement policies to the policy translation module 210 by way of a policy import service 212, as well as accessing or receiving previously defined procurement policies via a policy export service 214. As described in example embodiments below, the policy import service 212 may be configured to convert procurement policy definitions in a text-based format to a data-based format more amenable for processing and storage. In some example embodiments, the policy import service 212 may also check the incoming procurement policies for semantic and syntactic correctness. Oppositely, the policy export service 214 may be configured to convert previously stored procurement policies from the data-based format to a text-based format for review by a user of the policy administration application 112.

The policy translation module 210 may be configured to communicate with the policy persistence service 230, which may be configured to perform a number of functions involving the procurement policies. Such functions may include, in an example embodiment, generating lookup keys for the procurement policies so that they may be retrieved, persisting the procurement policies to the policy database 250, retrieving the procurement policies from the policy database 250 for review by a user of the policy administration application 112, and so on.

The policy database 250 may be any database, including a generic data store, configured to persist and to facilitate access to the procurement policies described herein. In example embodiments, the policy database 250 may include non-volatile data storage devices or systems, including, but not limited to, magnetic data storage, optical data storage, flash data storage, and the like.

Once a procurement policy has been persisted to the policy database 250, that policy may be employed by the policy enforcement application 114 via the procurement policy engine 116. In an example embodiment, the policy enforcement application 114 may be configured to communicate with the policy runtime module 220 by indicating a particular procurement policy, as well as providing data to be employed as input to the policy to determine whether the particular policy is being violated or adhered to for a particular transaction or operation, such as the purchase of a particular product by an employee, a selection of a particular supplier for a particular product, and so forth. To accomplish this task, the policy runtime module 220 may include one or more policy conversion services 222 that may be configured to convert the input data received from the policy enforcement application 114 to a form that may be consumed by the policy execution service 240.

In turn, the policy execution service 240 may be configured to receive the converted data from the policy runtime module 220, access the one or more procurement policies implicated by the received data, evaluate those policies using the received data, and return output regarding that evaluation via the policy runtime module 220 to the policy enforcement application 114. The policy enforcement application 114 may then interpret that output to allow or deny a particular purchase or transaction, impose additional requirements upon the user, require additional authorization for a particular transaction, and the like.

Figure 3:
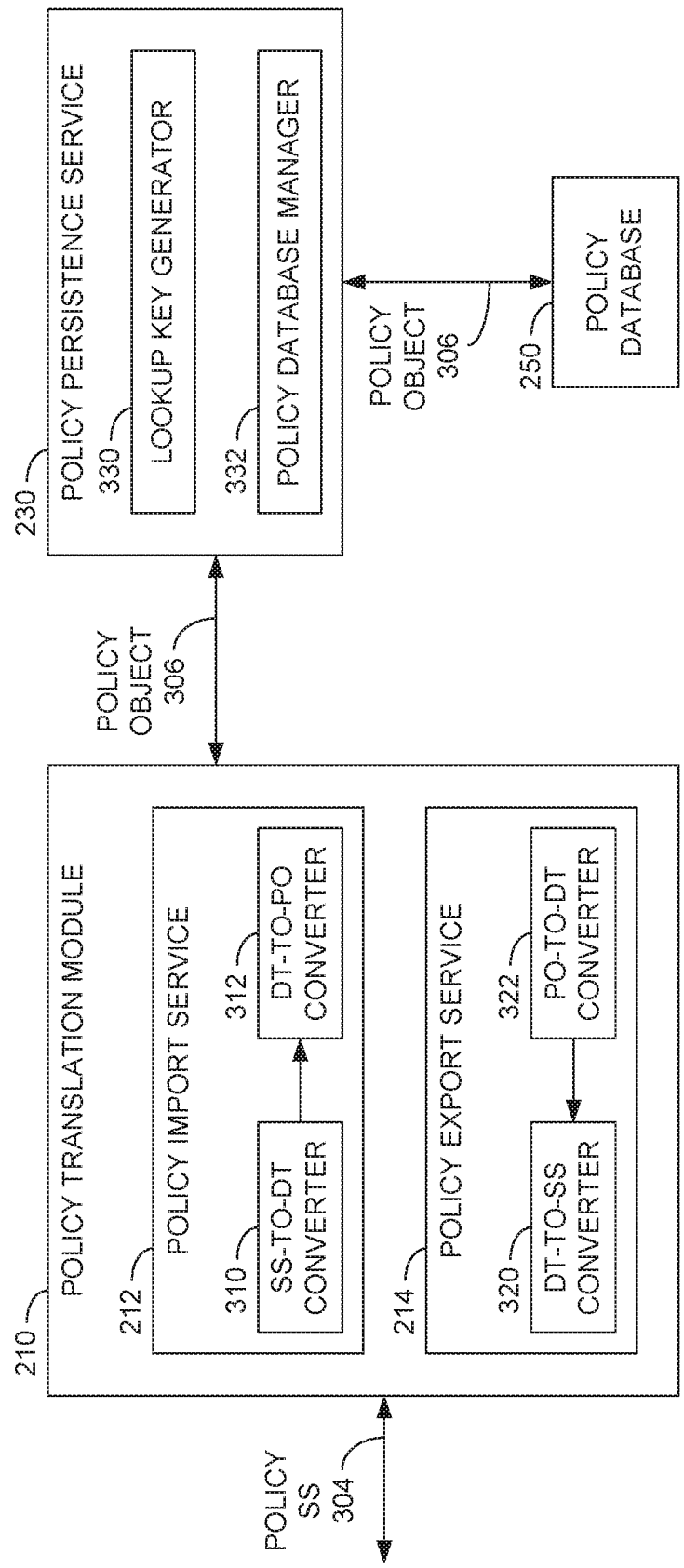
FIG. 3 is a block diagram of an example portion of the procurement policy engine of FIG. 2 employable for defining procurement policies.

FIG. 3 is a block diagram of an example portion of the procurement policy engine 116 of FIG. 2 (e.g., the policy translation module 210, the policy persistence module 230, and the policy database 250) employable for defining and reviewing procurement policies. In the example embodiment of FIG. 3, the policy import service 212 converts one or more procurement policies provided as a policy spreadsheet 304 into an intermediate datatable (e.g., a neutral tabular data object) format using a spreadsheet-to-datatable converter 310, and then converting the datatable into a policy object 306 using a datatable-to-policy object converter 312. An example embodiment of the policy object 306 is described below in conjunction with FIG. 4.

In an example embodiment, the policy spreadsheet 304 may be configured to include one or more spreadsheet rows for each procurement policy being defined. In addition, different aspects of each policy may be specified in separate columns of the spreadsheet. For example, each policy may be specified by a policy name and a corresponding text description of that policy. Also in example embodiments, each policy may be associated with a key and corresponding value. In example embodiments, the key and associated value may localize the particular policy to a particular environment (e.g., a specified geographic area, a particular organizational group, or the like) so that different policies for the same or similar procurement operations may apply to different geographic regions, departments, employees, and so on.

Also in the policy spreadsheet 304, each policy may include a logical expression (e.g., "price greater than $50.00") to be evaluated based on data values provided in a particular situation. In an example embodiment, the expression may be specified by a left-hand-side, a right-hand-side, and a binary operator relating those two values. In addition, the left-hand-side and the right hand-side may further be specified by way of a type (e.g., "field" or "constant") and an associated value (e.g., a name of a field (e.g., "purchaseReqForm.price") provided by a user when filling out a purchase requisition, a numeric value (e.g., "50.00"), and so on). Examples of the operator may include "greater than," "less than," "equals," and so on. Moreover, multiple expressions may be coupled by logical operators, such as "OR" and "AND". In example embodiments, the expression, when evaluated, provides an indication as to whether the corresponding procurement policy is being violated.

Also in example embodiments, the policy spreadsheet 304 may include one or more messages for each policy being defined that may ultimately be presented to the user via the policy enforcement application 114, such as when the policy has been violated. For example, such messages may indicate that a cost for a particular product being purchased exceeds a particular limit, an additional justification for a purchase must be presented, and so on. In some example embodiments, the messages may also include descriptions of options that may be presented to and selected by the user, such as justification options for a proposed purchase. Other aspects of each policy may be included in the policy spreadsheet 304 in other example embodiments.

In some example embodiments, the policy spreadsheet 304 (e.g., a Microsoft® Excel® spreadsheet) may be organized into multiple pages, with each page carrying a predefined number of the aspects that may be associated with each policy. In one example, textual policy descriptions, key-value definitions, expressions, and output messages for each procurement policy may reside on corresponding pages of the policy spreadsheet 304.

The policy translation module 210, in an example embodiment, may also perform a number of validations or checks on the incoming policy spreadsheet 304 (e.g., in the spreadsheet-to-datatable converter 310) to ensure an accurate generation of the corresponding policy object 306. For example, the policy translation module 210 may validate the descriptions, messages, and other textual data for each policy; the keys and associated values; the expressions, along with their associated fields, values, and operators; and the like.

In one example embodiment, the processing of a policy spreadsheet 304 by the policy translation module 210 may result in the generation of one or more policy objects 306. For instance, a policy spreadsheet 304 including definitions of a number of procurement policies may result in the generation of that same number of policy objects 306. However, other relationships between the number of procurement policies defined in a policy spreadsheet 304 and the number of policy objects 306 generated therefrom are also possible. If a validation error is encountered, the policy translation module 210 may generate an error indication for presentation to the administrator via the administrator system 120. In example embodiments, the error indication may specifically indicate the source of the problem within the policy spreadsheet 304, an example of how the error might be corrected, and so on.

Figure 4:
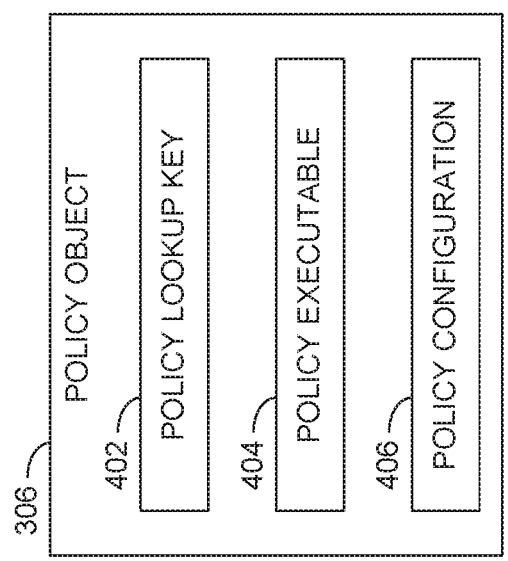
FIG. 4 is a block diagram of an example policy object that may be stored in a database of the procurement policy engine of FIG. 2.

If the policy translation module 210 (e.g., the spreadsheet-to-datatable converter 310) discovers no validation errors in the policy spreadsheet 304, the policy translation module 210 (e.g., the datatable-to-policy object converter 312) may be configured to generate the policy object 306. FIG. 4 is a block diagram of an example embodiment of the policy object 306 that may be generated and stored in the policy database 250, as shown in FIG. 3. In this example embodiment, the policy object 306 may include a policy lookup key 402, a policy executable 404, and a policy configuration 406.

In an example embodiment, the policy executable 404 includes executable code (e.g., JavaScript®) that, when executed, may evaluate the expressions stated in the policy spreadsheet 304. Further, the policy configuration 406, in an example embodiment, may include configuration data (e.g., in the form of a JSON® configuration file) that directly provides and/or indirectly refers the policy executable 404 to the input data employed by the policy executable 404 based on the information provided in the policy spreadsheet 304.

Also in example embodiments, the policy configuration 406 may include information indicating a type of output to be returned to the policy enforcement application 114 when the policy executable 404 is executed to evaluate a particular policy, as specified in the policy spreadsheet 304. In an example embodiment, the types of policy outputs may include an enrichment type, a validation rule type, and a query type. The enrichment type of output may be additional information returned to the policy enforcement application 114 that is to be presented to the user of the policy enforcement application 114 or employed by the policy enforcement application 114 or the procurement application 118 during the procurement process.

The validation rule type of output may provide an indication to the policy enforcement application 114 of whether the corresponding policy is being violated. Examples of such output may include as an indication that the proposed transaction is or is not allowable, a warning message regarding the proposed transaction, an indication that the user must provide additional justification to proceed with the proposed transaction, and the like.

The query type of output may be a query employable by the policy enforcement application 114 for filtering a list of items, such as a list of suppliers, based on data entered by the user via the policy enforcement application 114. Other lists of items may be filtered in other example embodiments. Moreover, other policy output types may be implemented in other example embodiments. In some example embodiments, the query type of output may be employed in an interactive fashion with the policy enforcement application 114 such that each of a series of inputs provided by a user may result in a corresponding policy evaluation.

Returning to FIG. 3, the policy translation module 210 may forward a generated policy object 306 to the policy persistence service 230 for storing the policy object 306 as a new policy, or for updating a previously created policy. In an example embodiment, the policy persistence service 230 may include a lookup key generator 330 configured to generate the policy lookup key 402 for the generated policy object 306. In an example embodiment, the lookup key generator 330 may utilize information originally provided in the policy spreadsheet 304 and possibly stored in the policy configuration 406, such as the type of procurement operation (purchase request, request-for-quote, and so on), keys and values associated with the policy, the policy output type, and other information. In an example embodiment, the lookup key generator 330 may concatenate one or more of these types of information to generate the policy lookup key 402.

In an example embodiment, the policy persistence service 230 may also include a policy database manager 332 that compares the generated policy lookup key 402 of the policy object 306 against the policy lookup keys 402 of other policy objects 306 that are currently stored in the policy database 250. If a corresponding policy object 306 does not currently exist in the policy database 250, the policy database manager 332 may store the generated policy object 306 to the policy database 250 as a new policy object 306. If, instead, the policy database manager 332 discovers a corresponding policy object 306 in the policy database 250 having the same policy lookup key 402 as the generated policy object 306, the policy database manager 332 may update or replace the previously stored policy object 306 with the generated policy object 306.

As indicated above, the policy translation module 210 may receive a request from the policy administration application 112 to access a previously stored procurement policy. In response, the policy translation module 210 may forward the request to the policy persistent service 230. The request may include the policy lookup key 402 of the policy object 306 to be retrieved, or information from which the lookup key generator 330 may generate the policy lookup key 402. The policy database manager 332 may use the policy lookup key 402 to retrieve the requested policy object 306 from the policy database 250 and forward the retrieved policy object 306 to the policy export service 214. The policy export service 214, in an example embodiment, may then convert the policy object 306 to a datatable format via a policy object-to-datatable converter 322, and then to a policy spreadsheet 304 representing the retrieved policy object 306 via a datatable-to-spreadsheet converter 320. The policy translation module 210 may then return the resulting policy spreadsheet 304 to the policy administration application 112. The administrator employing the administrator system 120 may then use the policy administration application 112 to review the returned policy spreadsheet 304, make changes directly to the policy spreadsheet 304, and then submit the altered policy spreadsheet 304 to the policy administration application 112 to update the policy database 250 accordingly, as described above.

Figure 5:
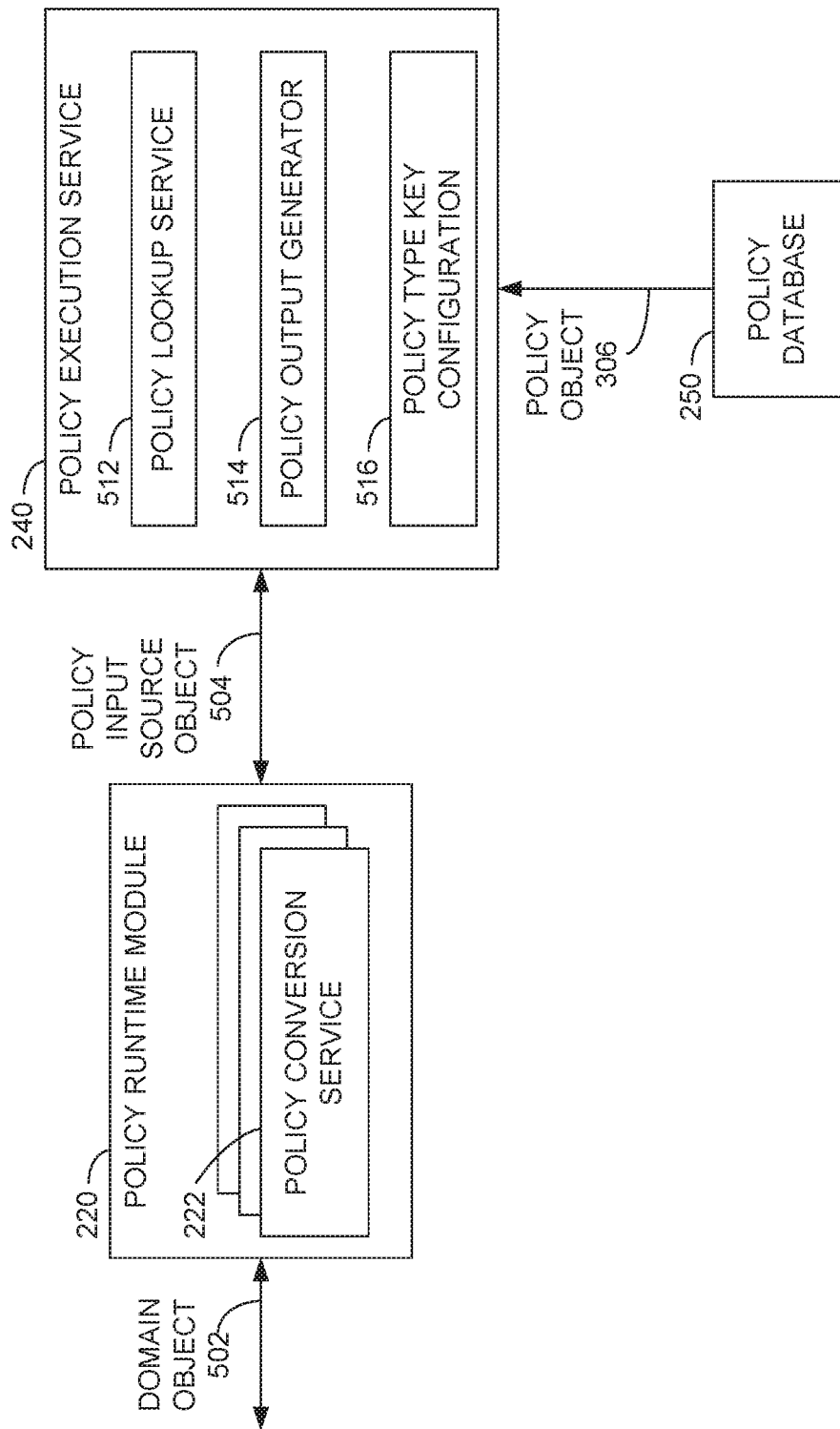
FIG. 5 is a block diagram of an example portion of the procurement policy engine of FIG. 2 employable for implementing procurement policies.

The policy objects 306 stored in the policy database 250 may be employed by the policy enforcement application 114 via the procurement policy engine 116, such as when a user enters a purchase request, initiates a request-for-quote, or performs another procurement function. FIG. 5 is a block diagram of an example embodiment of a portion of the procurement policy engine 116 employable for implementing those procurement policies. In this example embodiment, this portion of the procurement policy engine 116 includes the policy runtime module 220 and the policy execution service 240, as described above in connection with FIG. 2, as well as the policy database 250.

In an example embodiment, the policy runtime module 220 may receive a domain object 502 in response to a particular function of the policy enforcement application 114 initiated by the user, such as the filling of one or more fields of an electronic form associated with a particular procurement function, the submission of a completed electronic form for consideration, and so on. For example, the user may select a particular item for purchase and select a "purchase now" icon or button. In response to the user input for the policy enforcement application 114, the policy enforcement application 114 may generate a domain object 502 and forward the domain object 502 to the procurement policy engine 116 for processing. The domain object 502 may serve as a policy evaluation request from the perspective of the procurement policy engine 116.

In an example embodiment, the domain object 502 may include information indicating one or more particular policy objects 306 to be evaluated, as well as input information (e.g., user-provided information from an electronic form, constants to compare against the user-provided information, etc.) to be employed in the evaluation of a procurement policy. In an example embodiment, the policy enforcement application 114 may employ one or more different types of the domain objects 502, each of which may correspond with a particular type of procurement operation being performed. For example, the domain object 502 may be a requisition object, a request-for-quote object, a purchase request object, a supplier selection object, and so on.

In an example embodiment, the policy runtime module 220 receives the domain object 502 and converts the domain object 502 into a corresponding policy input source object 504. A policy conversion service 222 of the policy runtime module 220 may be perform the conversion. As illustrated in FIG. 5, the policy runtime module 220 may include multiple policy conversion services 222, wherein each policy conversion service 222 is configured to convert a particular type of domain object 502. In other example embodiments, a single policy conversion service 222 may be configured to convert all types of domain objects 502.

Figure 6:
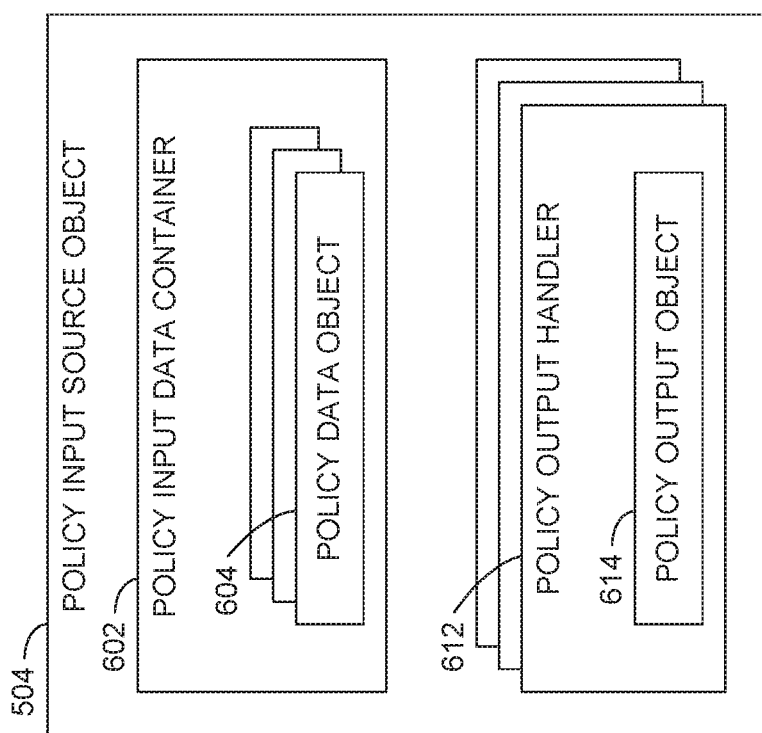
FIG. 6 is a block diagram of an example policy input source object employable in the procurement policy engine of FIG. 2 for implementing procurement policies.

The policy runtime module 220 may then forward the generated policy input source object 504 to the policy execution service 204 for policy evaluation. FIG. 6 is a block diagram of an example embodiment of the policy input source object 504. As shown, the policy input source object 504 may include a policy input data container 602 including one or more policy data objects 604. In an example embodiment, the domain object 502 includes multiple leaf-level objects arranged hierarchically. In the corresponding policy input source object 504, each of the leaf-level objects from the domain object 502 may be represented as a policy data object 604 within the policy input data container 602. For example, a purchase requisition form may be represented in a domain object 502 as a header and individual line items, with each line item represented as a policy data object 604 in the corresponding policy input source object 504 upon which the appropriate procurement policies may be evaluated. Moreover, each policy data object 604 may be configured as a map container that provides values employed by a corresponding expression employed in a procurement policy.

Also shown in FIG. 6, the policy input source object 504 may further include one or more policy output handlers 612, each of which may include a policy output object 614. In an example embodiment, a policy output handler 612 is created for each policy data object 604 in the policy input data container 602. Further, each of the policy output handlers 612 may handle any policy output created by the evaluation of the procurement policies on each of the policy data objects 604.

Returning to FIG. 5, after the policy conversion service 222 generates the policy input source object 504, the policy runtime module 220 forwards the policy input source object 504 to the policy execution service 240. The policy execution service 240, as shown in FIG. 5, may include a policy lookup service 512, a policy output generator 514, and a policy type key configuration 516. In response to the policy execution service 240 receiving the policy input source object 504 at the policy execution service 240, the policy lookup service 512 may access the policy type key configuration 516 to retrieve a key definition for the particular type of domain object 502 represented by the policy input source object 504. The policy lookup service 512 may also retrieve the corresponding values for keys from the various policy data objects 604 of the policy input source object 504. From this retrieved information, the policy lookup service 512 may generate the corresponding policy lookup key 402 for each policy object 306 of each procurement policy applicable to the policy data objects 604.

Upon retrieving the appropriate policy objects 306 from the policy database 250 using the generated policy lookup keys 402, the policy execution service 240 may invoke the policy output generator 514 for each policy executable 404 of each policy object 306 retrieved. In an example embodiment, the policy output generator 514 accesses a policy data object 604 and the policy configuration 406 of the policy object 306 as input for the policy executable 404 and executes the policy executable 404 to create a policy output object 614 containing the output or results of the policy executable 404. In some example embodiments, the policy output generator 514 may pass additional contextual information (e.g., user-specific information of the user using the policy enforcement application 114) to the policy executable 404.

The policy execution service 240 may assign each policy output object 614 generated by the policy output generator 514 to its corresponding policy output handler 612 of the policy input source object 504, which, when executed, assigns the policy output object 614 to its associated policy data object 604. In addition, the policy execution service 240 may also pass the modified policy input source object 504 to the appropriate policy conversion service 222 of the policy runtime module 220, which may then update the corresponding domain object 502 with the previously generated output from the one or more policy executables 404 and return the domain object 502 to the policy enforcement application 114. The policy enforcement application 114 may then indicate (e.g., display) to the client any policy violations or other information regarding evaluation of the procurement policies invoked by the user via the policy enforcement application 114.

Figure 7:
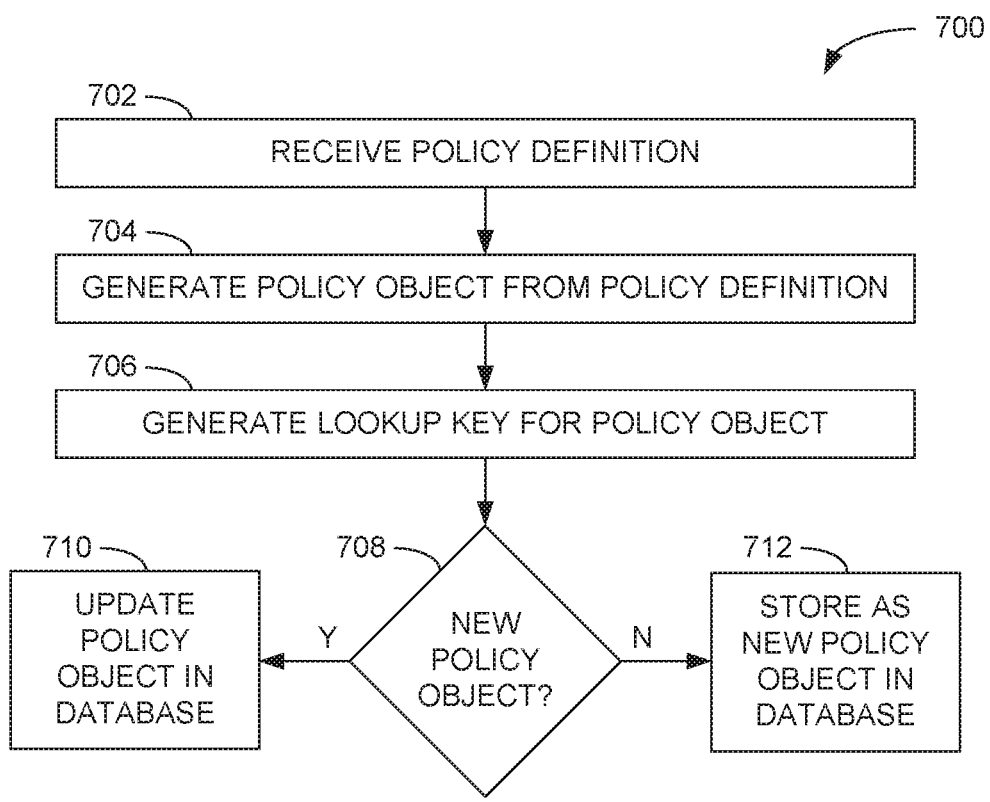
FIG. 7 is a flow diagram of an example method of generating and storing the policy objects of FIG. 4.

FIG. 7 is a flow diagram of an example method 700 of generating and storing the policy objects 306 of FIG. 4. While the following description of the method 700 presumes the use of the procurement policy engine 116 of FIGS. 1 through 6, as described above, other systems not specifically described herein may perform the method 700, as well as other methods described below, in other example embodiments.

In the method 700, the procurement policy engine 116 may receive a policy definition (operation 702), such as in the form of a policy spreadsheet 304, from the policy administration application 112. The procurement policy engine 116 may generate a policy object 306 from the policy definition (operation 704) and generate a lookup key for the policy object 306 (operation 706). In an example embodiment, the policy object 306 includes executable code (e.g., policy executable 404) that evaluates one or more expressions included in the policy definition. The procurement policy engine 116 may then determine whether the generated policy object 306 is a new policy object 306, or represents an update to a preexisting policy object 306 (operation 708). In an example embodiment, this determination may be made by comparing the policy lookup key 402 for the generated policy object 306 to policy lookup keys 402 for policy objects 306 that have already being stored (e.g., in database 250). If the policy lookup key 402 for the generated policy object 306 matches a policy lookup key 402 of a previously stored policy object 306, the previously stored policy object 306 is updated or replaced by the newly generated policy object 306 (operation 710). Otherwise, the newly generated policy object 306 is stored as a new policy object 306 (operation 712).

In FIG. 7, as well as other methods discussed herein, while a particular order of execution may be shown for a particular set of operations (e.g., operations 702-712), other orders of execution are also possible, including possible simultaneous, concurrent, or overlapping execution of two or more of the operations shown.

Figure 8:
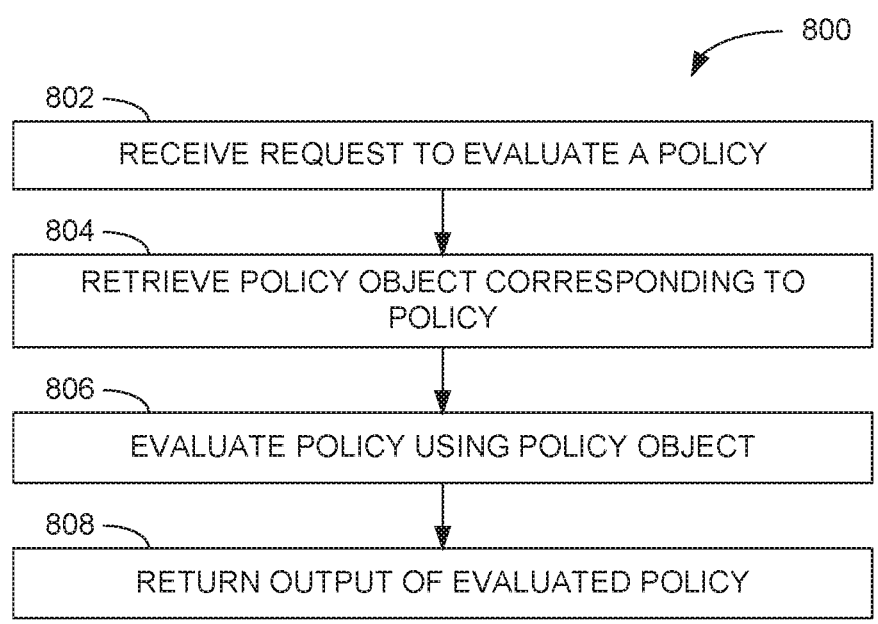
FIG. 8 is a flow diagram of an example method of processing a request to evaluate one or more procurement policies.

FIG. 8 is a flow diagram of an example method 800 of processing a request to evaluate one or more procurement policies. In the method 800, the procurement policy engine 116 may receive a request to evaluate a particular procurement policy (operation 802), such as in the form of a domain object 502 from the policy enforcement application 114. The procurement policy engine 116 may then retrieve a policy object 306 corresponding to the policy indicated in the request (operation 804) and evaluate the policy using the retrieved policy object 306 (operation 806). In an example embodiment, the policy is evaluated using executable code (e.g., policy executable 404) stored in the policy object 306. The procurement policy engine 116 may then return output from the evaluated policy to the requesting application (e.g., the policy enforcement application 114) (operation 808), such as by returning output generated by the policy executable 404.

Figure 9:
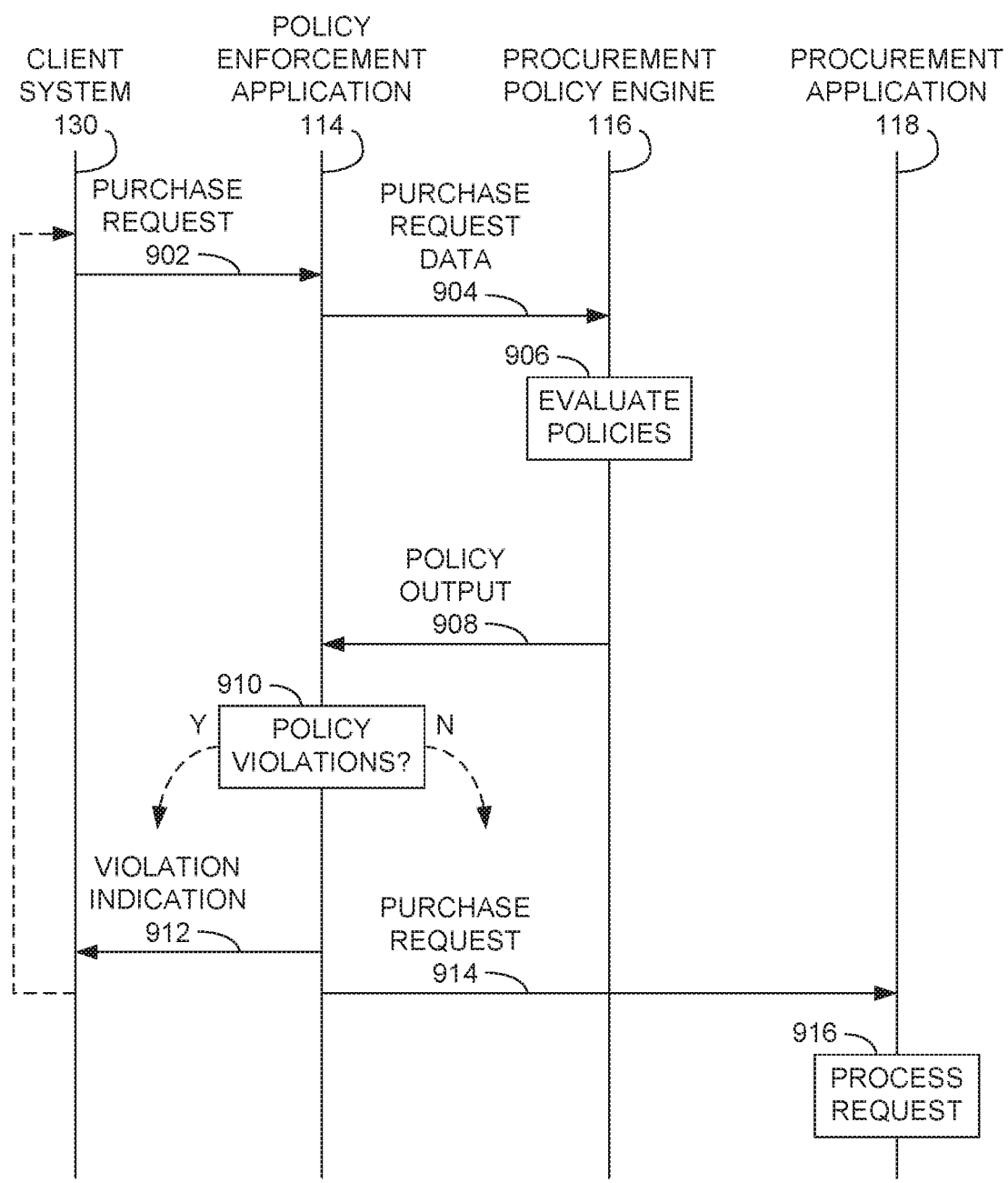
FIG. 9 is a communication diagram for evaluating one or more procurement policies associated with a purchase request.
Figure 10:
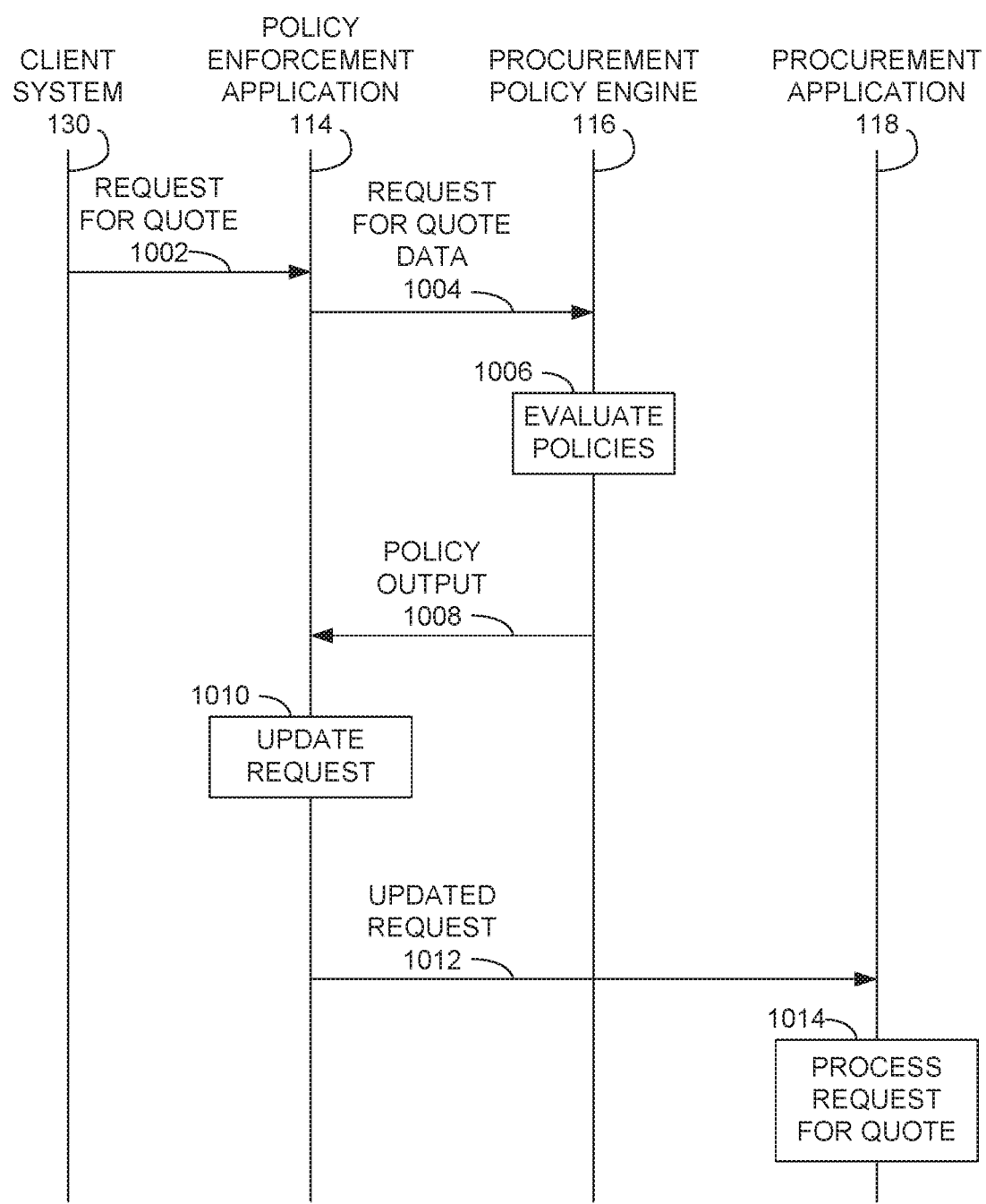
FIG. 10 is a communication diagram for evaluating one or more procurement policies associated with a request-for-quote.
Figure 11:
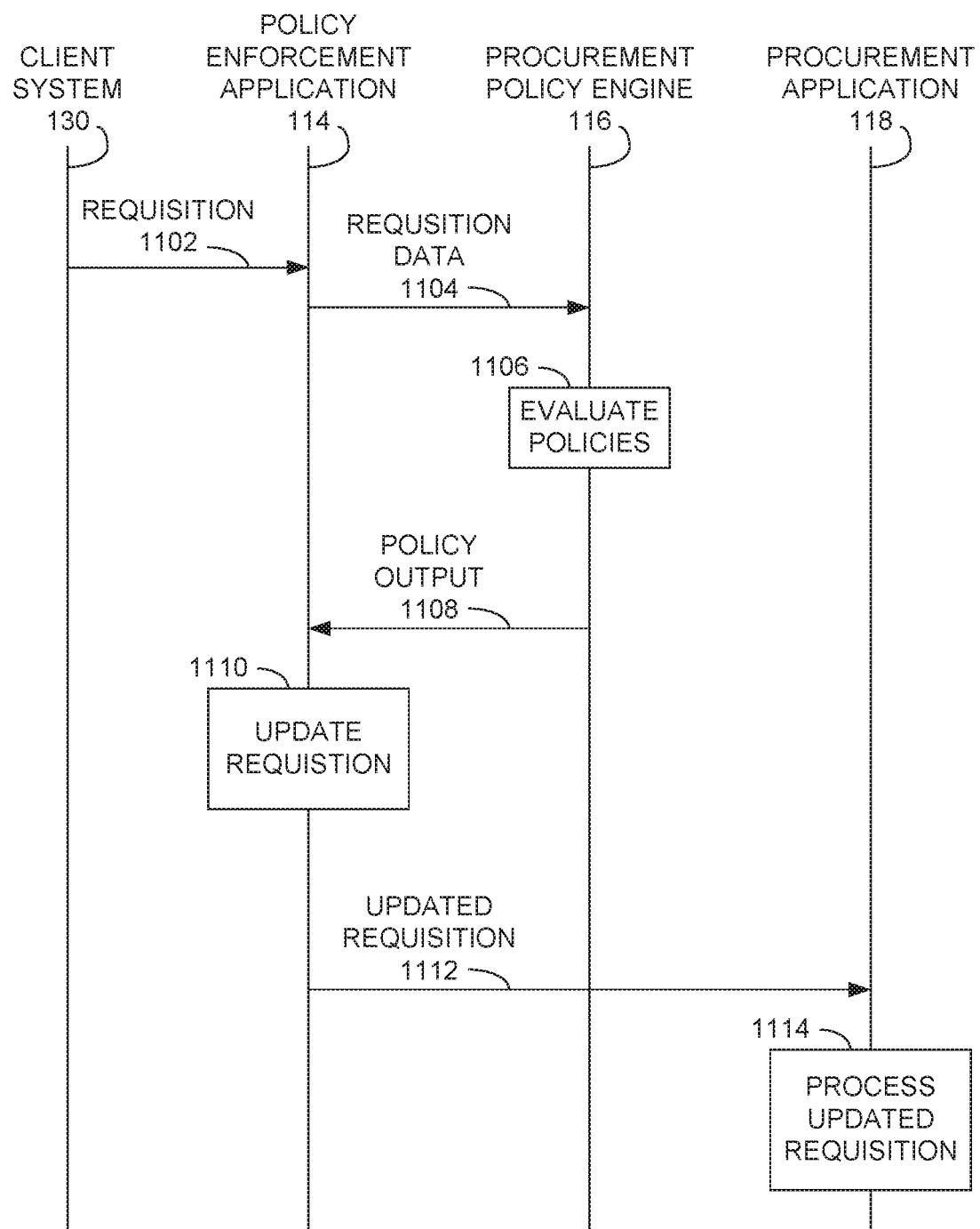
FIG. 11 is a communication diagram for evaluating one or more procurement policies associated with a requisition to purchase an item from one or more suppliers.

FIGS. 9, 10, and 11 are communication diagrams illustrating the operation of several systems depicted in FIG. 1 for different procurement operations facilitated by one or more procurement applications 118. More specifically, FIG. 9 is a communication diagram for evaluating one or more procurement policies associated with a purchase request 902. At the outset, the client system 130 may interact with the policy enforcement application 114 to issue the purchase request 902. In an example embodiment, the user may have selected a particular product for purchase (e.g., by way of a web browser application on the client system 130 interacting with the policy enforcement application 114 via the network 140) and activate an interface element (e.g., a graphical button) to initiate a purchase of the selected product.

In response to the purchase request 902, the policy enforcement application 114 may forward purchase request data 904 corresponding to the purchase request 902. In an example embodiment, the purchase request data 904 may be formatted as a domain object 502 of a type specifically associated with purchase requests 902. Using the purchase request data 904, the procurement policy engine 116 may evaluate one or more policies (e.g., using one or more policy objects 306 previously stored in the database 250) indicated in the purchase request data 904 (operation 906). For example, a policy indicating that the price of the particular produce selected by the user cannot exceed a first predetermined amount without justification for the purchase, or that the price cannot exceed a second, higher predetermined amount with such justification, may be applicable to the purchase request 902. The procurement policy engine 116 may then return policy output 908 from the policy evaluation to the policy enforcement application 114 (e.g., via the domain object 502).

The policy enforcement application 114, upon receiving the policy output 908, may determine whether any policies were violated in the purchase request 902 (operation 910). Presuming the policy has been violated in some manner, the policy enforcement application 114 may provide a violation indication 912 to the user via the client system 130. For example, the policy output 908 may indicate that the price of the requested purchase is allowable only with some reason or justification that the user has yet to provide. In response, the user may alter the purchase request 902 to provide the justification and resubmit the request 902 via the policy enforcement application 114. In another example, the policy output 908 may indicate that the price of the requested purchase is not allowable regardless of any justification that may be provided.

If, instead, the policy enforcement application 114 determines that the requested purchase does not violate the policy, the policy enforcement application 114 may then forward the purchase request 914 to the procurement application 118, which may then process the request (operation 916), thus causing the product of interest to be purchased.

FIG. 10 is a communication diagram for evaluating one or more procurement policies associated with a request-for-quote 1002. As shown, the client system 130 may interact with the policy enforcement application 114 to issue the request-for-quote 1002. In an example embodiment, the user may have used an electronic form or website to select one or more suppliers to receive a request to provide a pricing quote for a particular item selected by the user.

In response to the request-for-quote 1002, the policy enforcement application 114 may forward request-for-quote data 1004 corresponding to the request-for-quote 1002. In an example embodiment, the request-for-quote data 1004 may be formatted as a domain object 502 of a type specifically associated with a request-for-quote 1002. Using the request-for-quote data 1004, the procurement policy engine 116 may evaluate one or more policies (e.g., using one or more policy objects 306 previously stored in the database 250) indicated in the request-for-quote data 1004 (operation 1006). For example, policies applicable to the request-for-quote 1002 may indicate that a request for a quote must be provided to a minimum number of suppliers (or a minimum number of preferred suppliers), that the minimum number of suppliers depends on the type of item being sought, that the level of involvement required by the procurement department depends on the type of item sought, and so on. The procurement policy engine 116 may then return policy output 1008 from the policy evaluation to the policy enforcement application 114 (e.g., via the domain object 502).

The policy enforcement application 114, upon receiving the policy output 1008, may update the request-for-quote 1002 (operation 1010) based on the policy output 1008, such as whether any policies were violated in the purchase request-for-quote 1002 or whether additional involvement from the procurement department is necessary. For example, the user may not have selected as many suppliers as were necessary for the particular item. The policy enforcement application 114 may then forward the updated request-for-quote 1012 to the procurement application 118, which may then process the updated request-for-quote 1012 (operation 1014), thus causing the generation and distribution of the request-for-quote 1002 to suppliers. In some example embodiments, the policy enforcement application 114 may provide policy feedback and/or solicit additional input from the user via the policy enforcement application 114 to produce the updated request-for-quote 1012.

FIG. 11 is a communication diagram for evaluating one or more procurement policies associated with a requisition 1102. As depicted, the client system 130 may interact with the policy enforcement application 114 to issue the requisition 1102. In an example embodiment, the user may have used an electronic form or website that guides user selection of one or more suppliers as possible sources to supply one or more particular items selected by the user.

In response to the requisition 1102, the policy enforcement application 114 may forward requisition data 1104 corresponding to the requisition 1102. In an example embodiment, the requisition data 1104 may be formatted as a domain object 502 of a type specifically associated with a purchase requisition. Using the requisition data 1104, the procurement policy engine 116 may evaluate one or more policies (e.g., using one or more policy objects 306 previously stored in the database 250) indicated in the requisition data 1104 (operation 1106). For example, policies applicable to the requisition 1102 may indicate that a requisition must include a selected minimum number of suppliers (or a minimum number of preferred suppliers), that a particular level of management approval is required for certain types of items, and so on. The procurement policy engine 116 may then return policy output 1108 from the policy evaluation to the policy enforcement application 114 (e.g., via the domain object 502).

The policy enforcement application 114, upon receiving the policy output 1108, may update the requisition 1102 (operation 1110) based on the policy output 1108, such as whether any policies were violated in the requisition 1102, whether management approval is required, and so forth. The policy enforcement application 114 may then forward the updated requisition 1112 to the procurement application 118, which may then process the updated requisition 1112 (operation 1114). In some example embodiments, the policy enforcement application 114 may provide policy feedback and/or solicit additional input from the user via the policy enforcement application 114 to generate the updated requisition 1112.

In an example embodiment, a method for evaluating programmable conditions applicable to an operation comprises receiving, based on a communication of a client system with a system via a communication network, a request to evaluate one or more programmable conditions applicable to an operation, the request comprising data associated with the operation; retrieving, from a database, one or more objects representing the one or more programmable conditions, the one or more objects comprising executable code for determining compliance of the operation with the one or more programmable conditions; executing, by at least one hardware processor of a machine, at least a portion of the executable code based on the data associated with the operation; and returning, to a computing system issuing the request, an output of the executable code, the output comprising an indication as to whether the operation complies with the one or more programmable conditions.

In another example embodiment, including all previous example embodiments, the method further comprises determining a type of the operation based on the request, wherein the retrieving of the one or more objects is based on the determined type of operation.

In another example embodiment, including all previous example embodiments, the method further comprises generating a lookup key based on a key configuration corresponding to the type of the operation, wherein the retrieving of the one or more objects is based on the generated lookup key.

In another example embodiment, including all previous example embodiments, the generating of the lookup key is further based on one or more key fields and corresponding key values provided in the request that are associated with the type of operation.

In another example embodiment, including all previous example embodiments, the indication as to whether the operation complies with the one or more programmable conditions comprises one of allowable without further justification input, allowable with further justification input, and unallowable.

In another example embodiment, including all previous example embodiments, the output of the executable code comprises additional information for subsequent processing by the computing system issuing the request.

In another example embodiment, including all previous example embodiments, the output of the executable code comprises a query for filtering a list of selectable options based on the request.

In another example embodiment, including all previous example embodiments, the at least a portion of the executable code, when executed, generates a Boolean result based on the data associated with the operation; and the output of the executable code is based on the Boolean result.

In another example embodiment, including all previous example embodiments, the executable code encodes the one or more programmable conditions as a Boolean expression that, when evaluated using the data associated with the operation, yields the Boolean result.

In another example embodiment, including all previous example embodiments, each of the one or more objects further comprises configuration data, the configuration data comprising data providing or referring the data associated with the operation to the executable code.

In another example embodiment, including all previous example embodiments, each of the one or more objects further comprises configuration data, the configuration data comprising data indicating a type of the output of the executable code.

In another example embodiment, including all previous example embodiments, the data associated with the operation comprises input data entered by a user into one or more fields of an electronic form.

In another example embodiment, including all previous example embodiments, the request comprises a domain object from a policy enforcement application executing on the system, and the policy enforcement application is configured to generate the domain object based on the one or more fields of the electronic form.

In another example embodiment, including all previous example embodiments, the domain object comprises the data associated with the operation and information indicating the one or more objects representing the one or more programmable conditions.

In another example embodiment, including all previous example embodiments, the method further comprises converting the domain object into an input source object, wherein the input source object comprises an input data container including one or more policy data objects, wherein the policy data objects correspond to the one or more fields of the electronic form and indicate the one or more objects and the data associated with the operation; and one or more output handlers configured to process the output of the executable code of the one or more objects.

In another example embodiment, including all previous example embodiments, the retrieving of the one or more objects is based on the one or more policy data objects.

In another example embodiment, including all previous example embodiments, the method further comprises receiving, prior to the receiving of the request, definition information comprising a definition for each of the one or more programmable conditions; translating the definition information into the one or more objects; and for each of the one or more objects, checking whether a prior version of the object is stored in the database; updating the prior version of the object in the database based on a prior version of the object being stored in the database; and storing the object in the database based on a prior version of the object not being stored in the database.

In another example embodiment, including all previous example embodiments, a spreadsheet comprises the definition information.

In an example embodiment, a system comprises one or more hardware processors and a memory storing instructions that, when executed by at least one of the one or more hardware processors, cause the system to perform operations comprising receiving, based on a communication of a client system with a system via a communication network, a request to evaluate one or more programmable conditions applicable to an operation, the request comprising data associated with the operation; retrieving, from a database, one or more objects representing the one or more programmable conditions, the one or more objects comprising executable code for determining compliance of the operation with the one or more programmable conditions; executing at least a portion of the executable code based on the data associated with the operation; and returning, to a computing system issuing the request, an output of the executable code, the output comprising an indication as to whether the operation complies with the one or more programmable conditions.

In an example embodiment, a non-transitory computer-readable storage medium stores instructions that, when executed by one or more processors of a machine, cause the machine to perform operations comprising receiving, based on a communication of a client system with a system via a communication network, a request to evaluate one or more programmable conditions applicable to an operation, the request comprising data associated with the operation; retrieving, from a database, one or more objects representing the one or more programmable conditions, the one or more objects comprising executable code for determining compliance of the operation with the one or more programmable conditions; executing at least a portion of the executable code based on the data associated with the operation; and returning, to a computing system issuing the request, an output of the executable code, the output comprising an indication as to whether the operation complies with the one or more programmable conditions.

Figure 12:
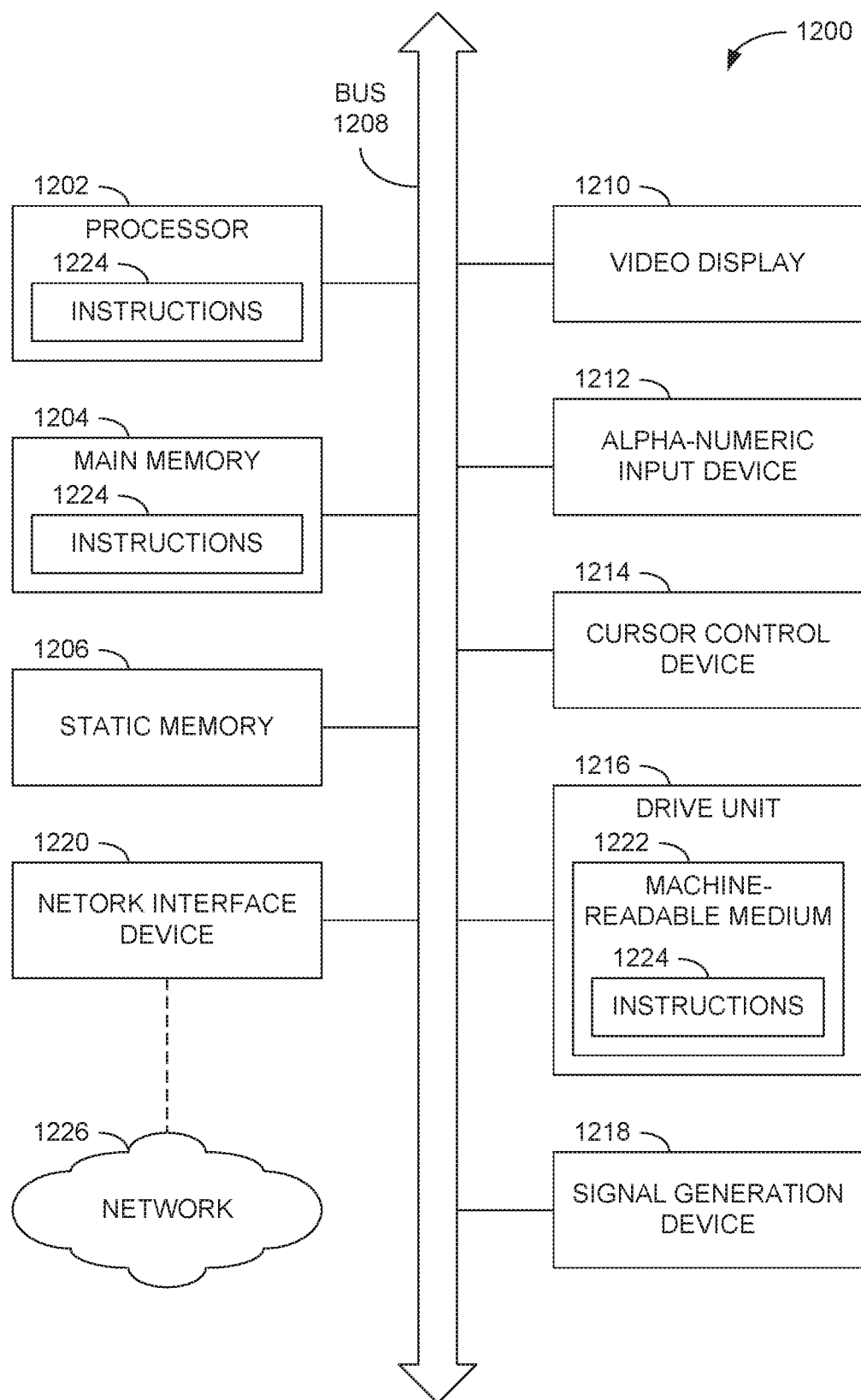
FIG. 12 is a block diagram of a computer processing system within which a set of instructions may be executed for causing the system to perform any one or more of the methodologies discussed herein.

FIG. 12 is a block diagram of a computer processing system 1200 within which a set of instructions 1224 may be executed for causing a computer to perform any one or more of the methodologies discussed herein, such as those discussed in conjunction with FIGS. 7 and 8, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 1200 may serve in example embodiments as, for example, the procurement policy engine 116 of FIGS. 1 and 2, as well as any component or module 210-250 described therewith, along with the administrator system 120, the client system 130, and other components of the procurement system 110.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1200 includes a processor 1202 (e.g., a central processing unit (CPU), a graphics processing unit (GPU), or both), a main memory 1204, and a static memory 1206, which communicate with each other via a bus 1208. The computer processing system 1200 may further include a video display 1210 (e.g., a plasma display, a liquid crystal display (LCD), or a cathode ray tube (CRT)). The computer processing system 1200 also includes an alphanumeric input device 1212 (e.g., a keyboard), a user interface (UI) cursor control device 1214 (e.g., a mouse and/or touch screen), a drive unit 1216, a signal generation device 1218 (e.g., a speaker), and a network interface device 1220.

The drive unit 1216 includes a machine-readable medium 1222 on which is stored one or more sets of instructions 1224 and data structures embodying or utilized by any one or more of the methodologies or functions described herein. The instructions 1224 may also reside, completely or at least partially, within the main memory 1204, the static memory 1206, and/or the processor 1202 during execution thereof by the computer processing system 1200, with the main memory 1204, the static memory 1206, and the processor 1202 also constituting tangible machine-readable media 1222.

The instructions 1224 may further be transmitted or received over a network 1226 via the network interface device 1220 utilizing any one of a number of well-known transfer protocols (e.g., Hypertext Transfer Protocol).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions 1224. The term "machine-readable medium" shall also be taken to include any medium that is capable of storing, encoding, or carrying a set of instructions 1224 for execution by the computer and that cause the computer to perform any one or more of the methodologies of the present application, or that is capable of storing, encoding, or carrying data structures utilized by or associated with such a set of instructions 1224. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A method comprising:
   receiving definition information comprising a definition for each of a plurality of policy objects, and for each policy object:
      translating the definition information into the policy object;
      comparing a policy lookup key for the policy object to policy lookup keys for stored policy objects to determine whether a prior version of the policy object is stored in the database;
      updating the prior version of the policy object in the database based on a prior version of the object being stored in the database; and
      storing the updated polity object in the database based on a prior version of the object not being stored in the database;
   receiving, at a policy enforcement application executing on a procurement system, a request submitted by a client system via a communication network for processing of an operation by a procurement application executing on the procurement system, the request comprising data associated with the operation;
   generating, by the policy enforcement application, a domain object comprising the data associated with the operation and information indicating the plurality of policy objects to be evaluated;
   forwarding the generated domain object from the policy enforcement application to a procurement policy engine executing on the procurement system to perform operations comprising:
   retrieving a key definition for a type of domain object represented by the domain object;
   retrieving corresponding values for keys from each of the plurality of policy objects to be evaluated;
   generating a corresponding policy lookup key for each policy object of the plurality of policy objects from the retrieved corresponding values for keys from each of the plurality of policy objects to be evaluated;
   retrieving each policy object using the generated lookup key for the policy object, each policy object comprising executable code for determining compliance of the operation with one or more policies based on the data associated with the operation;
   executing the executable code for each policy object to generate a policy output for each policy object; and
   updating the domain object with the generated policy output for each policy object;
   receiving the updated domain object with the generated policy output for each policy object at the policy enforcement application from the procurement policy engine;
   evaluating the policy output to determine whether the operation violates one or more policies;
   based on determining that the policy output indicates that the operation violates the one or more policies, returning, to the client system, from the policy enforcement application, an indication of the policy output without forwarding, from the policy enforcement application, the operation to the procurement application for the processing of the operation by the procurement application; and based on determining that the policy output indicates that the operation does not violate the one or more policies, forwarding the operation to the procurement application, from the policy enforcement application, for the processing of the operation by the procurement application.

2. The method of claim 1, wherein generating the policy lookup key for the policy object is further based on one or more key fields and corresponding key values provided in the request.

3. The method of claim 1, wherein the indication comprises one of allowable without further justification input, allowable with further justification input, and unallowable.

4. The method of claim 1, wherein the policy output comprises additional information for subsequent processing by the client system.

5. The method of claim 1, wherein the policy output comprises a query for filtering a list of selectable options based on the request.

6. The method of claim 1, wherein:
the executable code, when executed, generates a Boolean result based on the data associated with the operation; and
the policy output is based on the Boolean result;
wherein the executable code encodes the one or more programmable conditions as a Boolean expression that, when evaluated using the data associated with the operation, yields the Boolean result.

7. The method of claim 1, wherein each of the policy objects further comprises configuration data, the configuration data comprising at least one of: data providing or referring the data associated with the operation to the executable code, or data indicating a type of the policy output.

8. The method of claim 1, wherein the data associated with the operation comprises input data entered by a user into one or more fields of an electronic form.

9. The method of claim 8, further comprising:
converting the domain object into an input source object, wherein the input source object comprises:
an input data container including one or more policy data objects, wherein the one or more policy data objects correspond to the one or more fields of the electronic form and indicate the one or more policy objects and the data associated with the operation; and
one or more output handlers configured to process the policy output.

10. The method of claim 9, wherein the retrieving each policy object is based on the one or more policy data objects.

11. The method of claim 1, wherein a spreadsheet comprises the definition information.

12. The method of claim 1, wherein the policy output type comprises one of an enrichment type, a validation rule type, and a query type.

13. The method of claim 1, wherein retrieving the policy object using the generated lookup key for the policy object further comprises comparing the generated policy lookup key against policy lookup keys of other policy objects stored in a database.

14. The method of claim 1, wherein before receiving the request for processing the operation by the procurement application, the method comprises:
receiving definitions for a number of policies, each definition associated with a respective policy;
generating a policy object for each definition associated with the respective policy, the policy object comprising executable code for determining compliance of an operation, policy configuration data, and a type of output for the policy object;
storing each generated policy object in a database.

15. The method of claim 1, wherein generating the policy lookup key is further based on a policy output type for the policy object and the type of domain object and policy output type are concatenated to generate the policy lookup key.

16. The method of claim 1, wherein generating the policy lookup key is further based on at least one key and associated value for the policy object, the key and associated value localizing the policy object to a specified geographical area or a particular organizational group, and the type of domain object and at least one key and associated value are concatenated to generate the policy lookup key.

17. The method of claim 1, wherein generating a corresponding policy lookup key for the policy object based on the type of domain object associated with the domain object comprises accessing a policy type key configuration to retrieve a key definition for the type of domain object associated with the domain object.

18. A system comprising:
one or more hardware processors; and
a memory storing instructions that, when executed by at least one of the one or more hardware processors, cause the system to perform operations for enforcing one or more policies corresponding to a request submitted by a client system for processing of an operation by a procurement application executing on a procurement system, the operations comprising:
receiving definition information comprising a definition for each of a plurality of policy objects, and for each policy object:
translating the definition information into the policy object;
comparing a policy lookup key for the policy object to policy lookup keys for stored policy objects to determine whether a prior version of the policy object is stored in the database;
updating the prior version of the policy object in the database based on a prior version of the object being stored in the database; and
storing the updated polity object in the database based on a prior version of the object not being stored in the database;
receiving, at the policy enforcement application executing on a procurement system, a request submitted by a client system via a communication network for processing of an operation by a procurement application executing on the procurement system, the request comprising data associated with the operation;
generating, by the policy enforcement application, a domain object comprising the data associated with the operation and information indicating the plurality of policy objects to be evaluated;
forwarding the generated domain object from the policy enforcement application to a procurement policy engine executing on the procurement system to perform operations comprising:
retrieving a key definition for a type of domain object represented by the domain object;
retrieving corresponding values for keys from each of the plurality of policy objects to be evaluated;
generating a corresponding policy lookup key for each policy object of the plurality of policy objects from the retrieved corresponding values for keys from each of the plurality of policy objects to be evaluated;
retrieving each policy object using the generated lookup key for the policy object, each policy object comprising executable code for determining compliance of the operation with one or more policies based on the data associated with the operation;
executing the executable code for each policy object to generate a policy output for each policy object; and
updating the domain object with the generated policy output for each policy object;
receiving the updated domain object with the generated policy output for each policy object at the policy enforcement application from the procurement policy engine;
evaluating the policy output to determine whether the operation violates one or more policies;
based on determining that the policy output indicates that the operation violates the one or more policies, returning, to the client system, from the policy enforcement application, an indication of the policy output without forwarding, from the policy enforcement application, the operation to the procurement application for the processing of the operation by the procurement application; and
based on determining that the policy output indicates that the operation does not violate the one or more policies, forwarding the operation to the procurement application, from the policy enforcement application, for the processing of the operation by the procurement application.

19. A non-transitory computer-readable storage medium storing instructions that, when executed by one or more processors of a machine, cause the machine to perform operations enforcing one or more policies corresponding to a request submitted by a client system for processing of an operation by a procurement application executing on the procurement system, the operations comprising:
receiving definition information comprising a definition for each of a plurality of policy objects, and for each policy object:
translating the definition information into the policy object;
comparing a policy lookup key for the policy object to policy lookup keys for stored policy objects to determine whether a prior version of the policy object is stored in the database;
updating the prior version of the policy object in the database based on a prior version of the object being stored in the database; and
storing the updated polity object in the database based on a prior version of the object not being stored in the database;
receiving, at a policy enforcement application executing on a procurement system, a request submitted by a client system via a communication network for processing of an operation by a procurement application executing on the procurement system, the request comprising data associated with the operation;
generating, by the policy enforcement application, a domain object comprising the data associated with the operation and information indicating the plurality of policy objects to be evaluated;
forwarding the generated domain object from the policy enforcement application to a procurement policy engine executing on the procurement system to perform operations comprising:
retrieving a key definition for a type of domain object represented by the dom ain object;
retrieving corresponding values for keys from each of the plurality of policy objects to be evaluated;
generating a corresponding policy lookup key for each policy object of the plurality of policy objects from the retrieved corresponding values for keys from each of the plurality of policy objects to be evaluated;
retrieving each policy object using the generated lookup key for the policy object, each policy object comprising executable code for determining compliance of the operation with one or more policies based on the data associated with the operation;
executing the executable code for each policy object to generate a policy output for each policy object; and
updating the domain object with the generated policy output for each policy object;
receiving the updated domain object with the generated policy output for each policy object at the policy enforcement application from the procurement policy engine;
evaluating the policy output to determine whether the operation violates one or more policies;
based on determining that the policy output indicates that the operation violates the one or more policies, returning, to the client system, from the policy enforcement application, an indication of the policy output without forwarding, from the policy enforcement application, the operation to the procurement application for the processing of the operation by the procurement application; and
based on determining that the policy output indicates that the operation does not violate the one or more policies, forwarding the operation to the procurement application, from the policy enforcement application, for the processing of the operation by the procurement application.

* * * * *